United States Patent
Feng et al.

(10) Patent No.: US 10,436,577 B2
(45) Date of Patent: Oct. 8, 2019

(54) FULL-FIELD STATISTICAL AND CHARACTERIZING METHOD OF FLUID MICRO-EXPLORED STRAIN FOR ALLOY MICROSTRUCTURE

(71) Applicant: Central Iron and Steel Research Institute, Beijing (CN)

(72) Inventors: Guang Feng, Beijing (CN); Yunhai Jia, Beijing (CN); Haizhou Wang, Beijing (CN); Zhongnan Bi, Beijing (CN); Xuejing Shen, Beijing (CN); Peng Wang, Beijing (CN); Hailong Qin, Beijing (CN); Lei Zhao, Beijing (CN); Xing Yu, Beijing (CN); Dongling Li, Beijing (CN)

(73) Assignee: CENTRAL IRON AND STEEL RESEARCH INSTITUTE, Beijing (CN)

( * ) Notice: Subject to any disclaimer, the term of this patent is extended or adjusted under 35 U.S.C. 154(b) by 0 days.

(21) Appl. No.: 15/996,195

(22) Filed: Jun. 1, 2018

(65) Prior Publication Data
US 2019/0086194 A1    Mar. 21, 2019

(30) Foreign Application Priority Data

Sep. 21, 2017  (CN) .......................... 2017 1 0860708

(51) Int. Cl.
*G01B 11/16*     (2006.01)
*G01B 11/24*     (2006.01)
(52) U.S. Cl.
CPC ........ *G01B 11/161* (2013.01); *G01B 11/2441* (2013.01)
(58) Field of Classification Search
CPC ... G02B 1/12; G02B 1/02; G02B 1/14; G02B 5/0891; G02B 1/10; G02B 7/181;
(Continued)

(56) References Cited

U.S. PATENT DOCUMENTS

2003/0174300 A1*  9/2003  Endo ................. G03F 7/705
                                               355/55
2017/0120337 A1*  5/2017  Kanko ................ B22F 3/1055
(Continued)

OTHER PUBLICATIONS

G. Feng et al., "Contour map of nano-mechanical-properties using Isostatic Pressing", Scripta Materialia 137, 2017, pp. 69-72.

*Primary Examiner* — Michael P Stafira
(74) *Attorney, Agent, or Firm* — Muncy, Geissler, Olds & Lowe, P.C.

(57) ABSTRACT

The invention relates to a full-field statistical & characterizing method of fluid micro-explored strain for alloy microstructure, comprising the following steps: a. grinding and polishing the surface of an alloy sample to mirror with no grinding defects, and then determining a to-be-measured area on the surface of the alloy sample; b. utilizing a white light interferometry 3D surface profiler to perform initial morphology measurement on the surface of an alloy sample; c. utilizing an isostatic pressing technology to obtain the microstructure deformation on the surface of the alloy sample, and then utilizing a white light interferometry 3D surface profiler to perform deformed morphology measurement on the surface of the alloy sample to obtain a changing spectrum of micro morphology of the microstructures on the surface of the alloy; and d. performing trans-scale and rapid quantitative statistical distribution characterization on the morphology change before and after isostatic pressing of the microstructures in the to-be-measured area of the alloy, so as to obtain a corresponding full-field metallography. In the present invention, the sample pretreatment is simple, the analysis speed is rapid, the scanning area is large, and the requirement of high throughput trans-scale analysis can be satisfied, so as to instruct the extraction of the material metallography feature unit.

8 Claims, 4 Drawing Sheets

(58) Field of Classification Search
CPC ........... G02B 2006/12097; G02B 2006/12147; G02B 2006/1215; G02B 2006/12159; G02B 26/103; G02B 6/10; G02B 6/12007; G02B 6/1228; G02B 6/132; G02B 6/136; G02B 6/4296; G02B 6/4298; G02B 1/11; G02B 1/113; G02B 21/34; G02B 27/0025; G02B 5/08; G02B 5/28; G02B 5/285; G02B 5/288; G02B 5/289; G02B 6/264; G01B 11/161; G01B 9/02083; G01B 9/02091; G01B 9/0209; G01B 11/2441; G01N 2021/8416; G01N 21/45; G01N 2021/8411; G01N 21/00; G01N 21/71; G01N 2291/02458; G01N 2291/044; G01N 2291/2693; G01N 29/043; G01N 29/11; G01J 9/00

See application file for complete search history.

(56) References Cited

U.S. PATENT DOCUMENTS

2017/0221786 A1* 8/2017 Konishi ................. B23K 20/00
2018/0105925 A1* 4/2018 Simons ................. H01J 37/342

* cited by examiner

FULL-FIELD STATISTICAL AND CHARACTERIZING METHOD OF FLUID MICRO-EXPLORED STRAIN FOR ALLOY MICROSTRUCTURE

TECHNICAL FIELD

The present invention belongs to the technical field of surface micro-area analysis in the field of material science, and in particular to a full-field statistical & characterizing method of fluid micro-explored strain for alloy microstructure, and the method is combined with the isostatic pressing fluid stress and strain technology to perform trans-scale quantitative statistical mapping evaluation on the microstructure and metallography of an alloy.

BACKGROUND ART

In ordinary metal microstructure inspection, common display methods of the microstructures after the microstructures are polished include an optical method, an etching method and an interference layer method, while the follow-up inspection of the microstructure and the analysis of metallography are mainly by means of the image observation and analysis of the microscope. The solution proportioning and reaction time of the etching method have a direct influence on the authenticity and clarity of displaying the metal microstructure, while image observation is limited by the amplification factor of the microscope. Therefore, the result of metallography has certain subjectivity and volatility, and cannot be accurately and quantitatively determined.

In the metal industry, the isostatic pressing technology is widely used to further improve the uniformity of the alloy microstructure. With the difference between the isostatic pressure and the mechanical property of the alloy microstructure, collapse and deformation will be different, meanwhile, the deformation behavior on the surface will be severe than the deformation behavior inside the alloy sample. Therefore, the isostatic pressing technology can be used to distinguish the microstructures with different hardness and mechanical properties on the surface of the alloy sample.

When the isostatic pressure is used to carry out the microstructure metallographic determination with the fluid micro-explored strain, the microstructure can only be subjected to elastic plastic deformation in the vertical loading direction, and the microstructure will sink into a 'horizontal potential well' in the horizontal surface under the uniform extrusion effect of the pressure transmission medium and will not generate horizontal dislocation and slip. Therefore, no interference will be generated on the horizontal position of the microstructure.

In traditional metal microstructure inspection method, metallographic analysis is a macroscopic method, and rely more on subjective judgment and image magnification factor, while in the present invention, a technical method is adopted to characterize multiple parameters, when the full-field metallography of alloy microstructure is given, the statistical results of quantitative metallographic analysis can also be given.

SUMMARY OF THE INVENTION

The objective of the present invention is to provide a full-field statistical & characterizing method of fluid micro-explored strain for alloy microstructure, the method is combined with the isostatic pressing fluid stress and strain technology to perform trans-scale and quantitative statistical mapping evaluation on the microstructure and metallography of an alloy, and the samples can be used for rapidly analyzing the full-field metallography of the microstructures in the alloy with no need of being etched or coated.

In order to achieve the above objective, the present invention provides the following technical solutions:

The present invention provides a full-field statistical & characterizing method of fluid micro-explored strain for alloy microstructure, including the following steps:

a. grinding and polishing the surface of an alloy sample to mirror finish with no grinding defects, and then determining a to-be-measured area on the surface of the alloy sample;

b. utilizing a white light interferometry 3D surface profiler to perform initial morphology measurement on the surface of the alloy sample to obtain the size, spacing and length-width ratio of microstructures on initial alloy surface;

c. utilizing isostatic pressing technology to obtain the microstructure deformation on the surface of the alloy sample, and then utilizing a white light interferometry 3D surface profiler to perform deformed morphology measurement on the surface of the alloy sample to obtain the size, spacing and length-width ratio of the deformed microstructures on the surface of the alloy; performing statistical analysis on the comparison between the size, spacing and length-width ratio of the microstructures on the initial alloy surface and those of the deformed microstructures on the surface of the alloy to obtain deformation data on the surface of the alloy, and mapping to obtain the deformation strength of the microstructures on the surface of the alloy; and calculating to obtain a changing spectrum of micro morphology of the size, spacing and length-width ratio of the microstructures on the surface of the alloy base on distribution of deformation strength of the microstructures on the surface of the alloy;

d. performing trans-scale and rapid quantitative statistical distribution characterization on the morphology change before and after isostatic pressing of the microstructures in the to-be-measured area of the alloy, so as to obtain a corresponding full-field metallography.

The alloy sample is prepared based on the requirement of metallography analysis.

In step a, the size of the to-be-measured area is 1~25 mm×1~25 mm.

In steps b and c, analysis method in measuring software of the white light interferometry 3D surface profiler is set to be a surface scanning mode, and the scanned area is larger than the to-be-measured area.

In steps b and c, the white light interferometry 3D surface profiler performs multiple scanning directly to obtain the morphology change of the surface of the alloy sample and the distributed digital signals.

In step c, the isostatic pressing technology is as follows: the alloy sample is placed in an isostatic pressing machine, a pressure of 50-200 MPa is applied in room temperature for 10-30 minutes, thereby enabling the microstructures on the surface of the alloy sample to form a vertical elastic plastic deformation.

The pressure transmission medium in the isostatic pressing machine is liquid or gas which can effectively transmit pressure and has no corrosion and pollution to the to-be-measured sample.

In step d, the changing spectrum of micro morphology obtained in step c is converted to a data matrix form; with the data matrix as a mapping map, the isostatic pressing deformation data corresponding to the to-be-measured area are respectively calculated, thereby realizing rapid and trans-scale quantitative statistics and characterization analysis of metallography of the microstructures in the to-be-measured area.

Compared with the prior art, the present invention has the following beneficial effects:

1. compared with microstructure display methods including optical method, etching method and interference layer method in traditional metal microstructure inspection methods, when an isostatic pressing technology is adopted to characterize the microstructure, the to-be-measured samples only need to be polished during pretreatment, then a pressure is exerted on the microstructures of the material surface via the pressure transmission medium to generate a micro elastic plastic deformation, the exerted pressure and the pressure time can be quantitatively controlled for different microstructures of different materials, therefore, standardization is easier, follow-up component measurement is not interfered, the method in the present invention is more lossless with no pollution compared with traditional etching method, and the application range is more wide compared with the optical method.

2. compared with the microscopic observation method in the traditional metal microstructure inspection method, in the white light interference scanning technology, after the test sample is placed stably, continuous scanning in a large area can be performed, the morphology change and distribution on the surface of the to-be-measured samples are subjected to large-scale and gapless statistics, thereby realizing high-resolution distribution analysis on the surface of samples, while traditional microscopic observation requires the switching of a lens, the adjustment of the light source, the switching of an optical filter and the selection of a diaphragm, therefore, the interference factors are more complex, and full-field analysis is not easy to realize.

3. compared with image acquisition in traditional metal microstructure inspection method, in the isostatic pressing white light interference scanning technology, gapless statistics of the morphology change and distribution data of the surface of the to-be-measured samples can be obtained directly through scanning, thereby avoiding the interference factors brought about by the traditional two-dimensional image acquisition method, meanwhile, the resolution is higher. After traditional image acquisition, the acquired images need to be subjected to such adjustments in brightness, contrast ratio, grey variation, light equalization correction and edge enhancement, and the degree of adjustment may lead to wrong or misleading analysis on the acquired images.

4. compared with microstructure analysis and metallographic analysis in traditional metal microstructure inspection method, in the isostatic pressing white light interference scanning technology, such parameters as phase volume percentage, average grain size, analysis particle size and non-metal inclusion content can be obtained directly through data statistics based on corresponding morphology changes of different phases, no estimation is required and the data are more accurate and reliable.

In conclusion, the trans-scale and rapid quantitative statistical distribution characterization of the full-field metallography of the microstructure on the alloy surface in the present invention has the advantages of simple pretreatment of samples, rapid analysis speed and large scanning area and can satisfy the requirement of high throughput trans-scale analysis, so as to instruct the extraction of the metallography feature unit of materials. In addition, by utilizing the isostatic pressing white light interference scanning technology, not only a certain area can be subjected to statistical scanning analysis, continuous scanning analysis data in the area can also be given, therefore, compared with conventional metal microstructure inspection technology, the technology in the present invention has more quantitative data, more precise resolution and wider application range.

Figure 1:
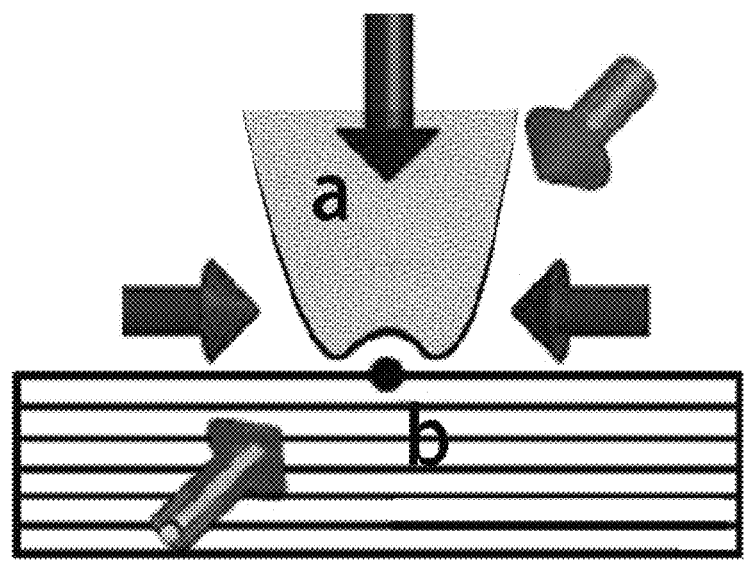
FIG. 1 is a schematic diagram of an isostatic pressure action principle at the microstructure of the alloy surface in the present invention (the arrow direction is the pressure direction)

Wherein the reference numerals are:
a. isostatic pressure;
b. alloy microstructure
c. ferritic matrix
d. carbide microstructure

DETAILED DESCRIPTION OF THE EMBODIMENTS

The present invention will be further described below in combination with the embodiments.

A full-field statistical & characterizing method of fluid micro-explored strain for alloy microstructure is used for realizing trans-scale and rapid quantitative statistical distribution characterization of the full-field metallography spectrum of the microstructure on the alloy surface.

For the implementation of the present invention, an isostatic pressing machine and a white light interferometry 3D surface profiler need to be applied. The isostatic pressing machine includes a host system, a pressurization system, a hydraulic transmission system, an electrical control system and related accessories; and the white light interferometry 3D surface profiler includes an optical microscopy interference unit, a stepping motor focusing unit, a piezoelectric ceramic scanning unit, a diffraction grating measurement unit and a scanning control and measurement software.

Figure 2:
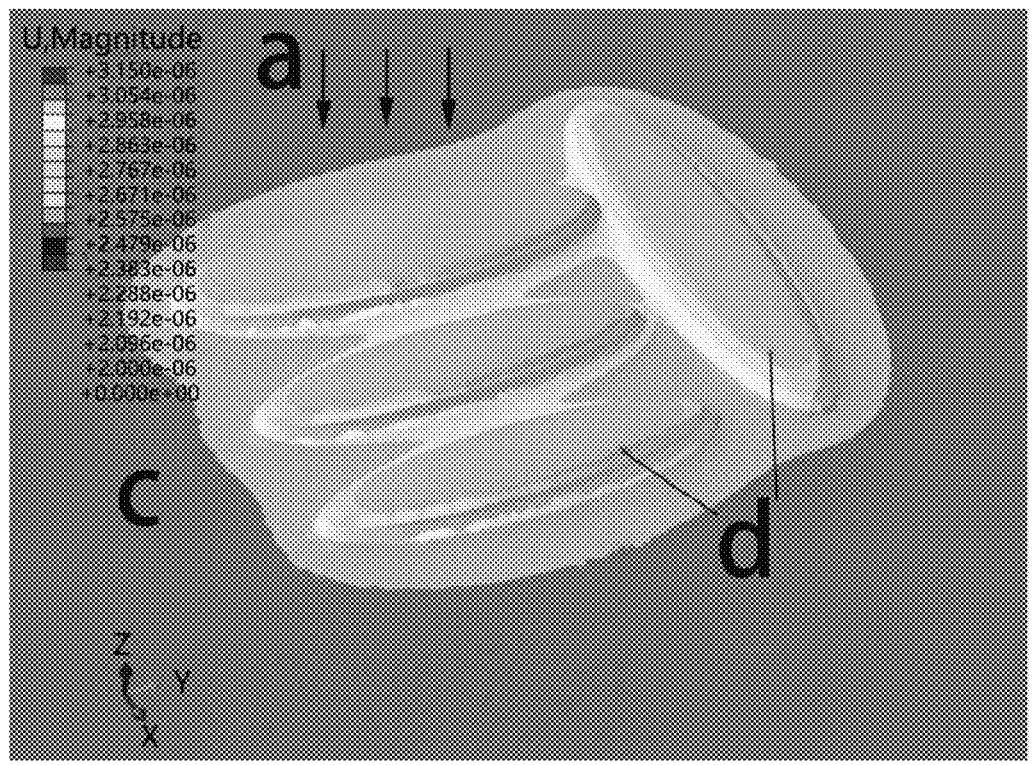
FIG. 2 is a schematic diagram of an isostatic pressure action principle of the carbide and the ferrite in embodiment of the present invention (the arrow direction is the pressure direction)

As shown in FIG. 1 and FIG. 2, in an isostatic pressing machine, high pressure will be applied to the surface of an alloy sample through the pressure transmission medium, then the microstructures on the surface of the alloy sample form a vertical elastic plastic deformation, and the deformation degree of the microstructures on the alloy surface can be controlled by regulating the pressure and applied time of the isostatic pressing machine. The samples before and after isostatic pressing treatment are measured via a white light interferometry 3D surface profiler, so as to obtain the high-resolution and rapid statistical distribution characterization map of the full-field morphology of the alloy microstructure.

Figure 7:
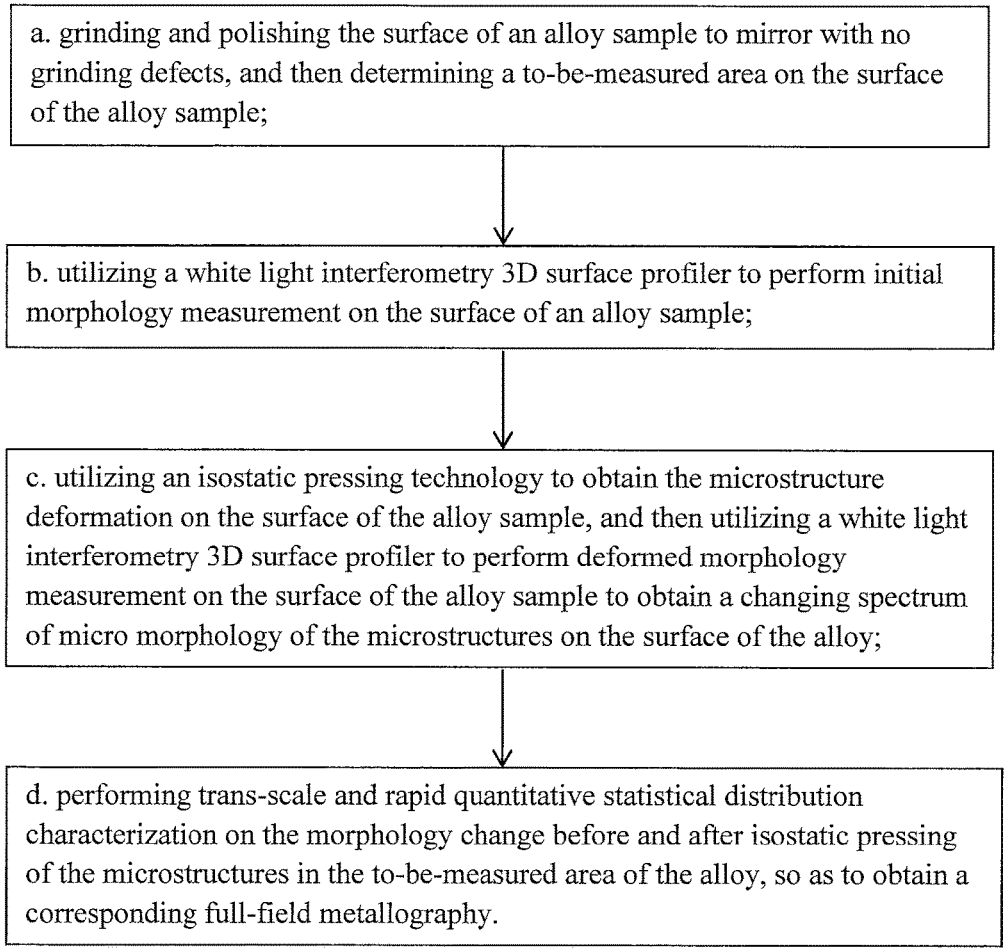
FIG. 7 is a flow diagram showing the steps of the full-field statistical & characterizing method of fluid micro-explored strain for alloy microstructure.

The method includes the following steps:

As shown in FIG. 7, the full-field statistical & characterizing method of fluid micro-explored strain for alloy microstructure includes the following steps:

a) grinding and polishing the surface of an alloy sample to mirror finish with no grinding defects, and then determining a to-be-measured area on the surface of the alloy sample, wherein the alloy sample is prepared based on the requirement of metallography analysis; the size of the to-be-measured area is 10 mm×10 mm.

b) utilizing a white light interferometry 3D surface profiler to perform initial morphology measurement on the surface of an alloy sample to obtain the size, spacing and length-width ratio of microstructures on the initial alloy surface;

c) utilizing an isostatic pressing technology to obtain the microstructure deformation on the surface of the alloy sample, and then utilizing a white light interferometry 3D surface profiler to perform deformed morphology measurement on the surface of the alloy sample to obtain the size, spacing and length-width ratio of the deformed microstructures on the surface of the alloy; performing statistical analysis on the comparison between the size, spacing and length-width ratio of the microstructures on the initial alloy surface and those of the microstructures on the deformed surface of the alloy to obtain deformation data on the surface of the alloy, and mapping to obtain the deformation strength of the microstructures on the surface of the alloy; and calculating to obtain a changing spectrum of micro morphology of the size, spacing and length-width ratio of the microstructures on the surface of the alloy;

the analysis method in the measuring software of the white light interferometry 3D surface profiler is set to be a surface scanning mode, and the scanned area is larger than the to-be-measured area; after the alloy sample is subjected to isostatic pressing treatment, the microstructures on the surface of the alloy form elastic plastic deformation of different degrees, and the nanoscale deformation data of the surface of the alloy can be obtained.

In the initial stage of isostatic pressing treatment, now the pressure begins to rise slowly (less than 50 MPa) and the acting time is relatively short (less than 1 minute), a slip system generated by the microstructure on the alloy surface under the pressure effect moves in the surface range of a single crystal grain on the surface, at this time, dislocation slip can be conducted free of barriers along a certain crystal surface, the deformation generated by the microstructure on the alloy surface is elastic deformation which can be recovered after the pressure is removed and is difficult to measure; then when the pressure is increased to be greater than 50 MPa and the acting time is increased to be more than 10 minutes, the deformation generated by the microstructure on the alloy surface is increased, slip is gradually blocked, until a rated pressure and the pressure time are reached, at this time, the deformation generated by the microstructure on the alloy surface is elastic plastic deformation which cannot be recovered after the pressure is removed and can be measured later, if the pressure is increased continuously (greater than 200 MPa) and the acting time is prolonged (more than 30 minutes), the microstructure on the alloy surface will be damaged, and an overlarge vertical deformation amount will also exceed the measurement range of the white light interferometry 3D surface profiler, thereby influencing the precision and accuracy of measured data; therefore, the micromechanical performance parameters of the microstructure on the alloy surface corresponding to the deformation data are determined by the slip system in a single crystal grain on the surface or in several crystal grains on the shallow surface.

The microstructure on the surface of the alloy will be dramatically deformed. The deformation strength of the alloy microstructures in the to-be-measured area can be obtained by mapping the deformation data of the alloy surface obtained through comparative statistical analysis.

The greater the deformation is, the greater the difference of the mechanical properties of the corresponding microstructures on the alloy surface is. Based on the deformation distribution after isostatic pressing treatment, the changing spectrum of micro morphology of size, spacing and length-width ratio corresponding to the microstructure on the alloy surface is calculated and obtained; and d) performing trans-scale and rapid quantitative statistical distribution characterization on the morphology change before and after isostatic pressing of the microstructures in the to-be-measured surface of the alloy, so as to obtain a corresponding full-field metallographic spectrum.

The changing spectrum of micro morphology obtained in step c) is converted to a data matrix form. With the data matrix as a mapping spectrum, the isostatic pressing deformation data of corresponding areas are respectively calculated, thereby realizing rapid and trans-scale quantitative statistics and characterization analysis of metallography of the microstructures in the to-be-measured area.

EMBODIMENT (With the micromechanical property characterization of the carbide and ferrite in the high-chromium cast iron with grade of KmTBCr15Mo as an example)

In the present embodiment, the isostatic pressing technology being used to perform metallography characterization on the carbide and ferrite in the high-chromium cast iron with grade of KmTBCr15Mo is taken as an example for illustration.

Figure 3:
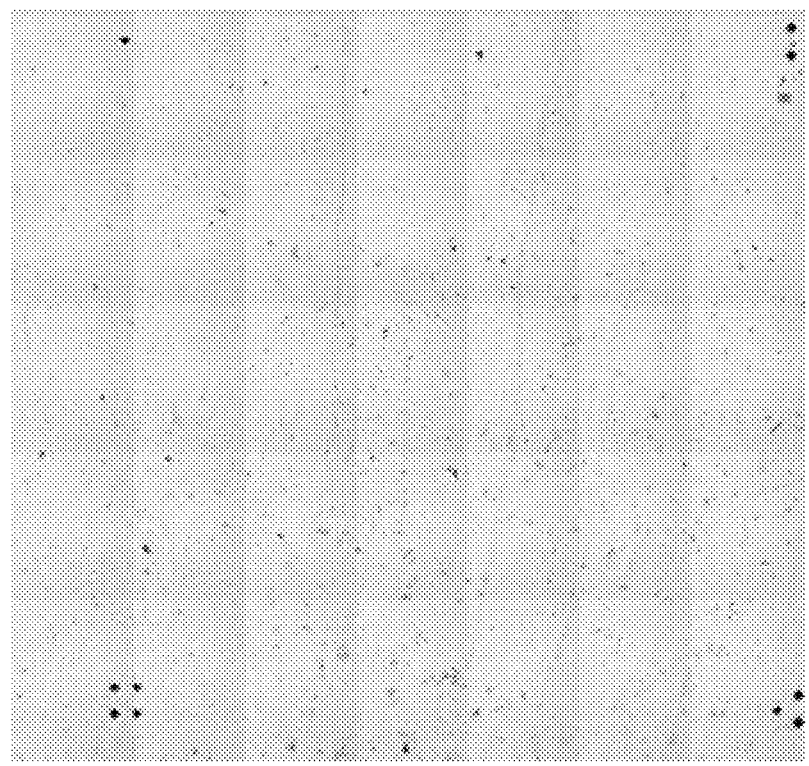
FIG. 3 is a metallographic and optical method map of the microstructures in the to-be-measured area of the comparative embodiment of the present invention.
Figure 4:
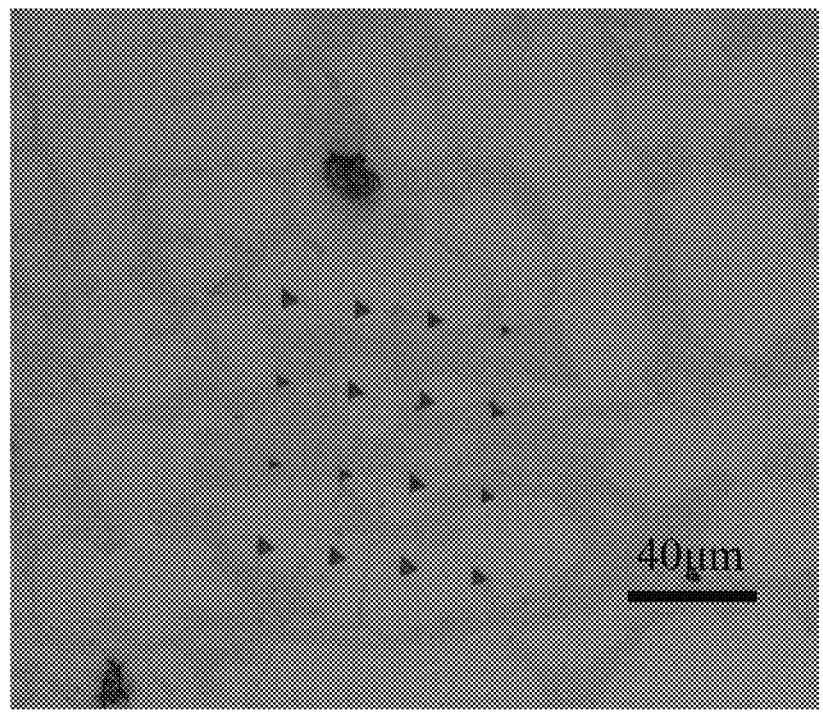
FIG. 4 is a metallographic and optical method map of the size, spacing and length-width ratio of carbide and ferrite in the selected feature area in FIG. 3.
Figure 5:
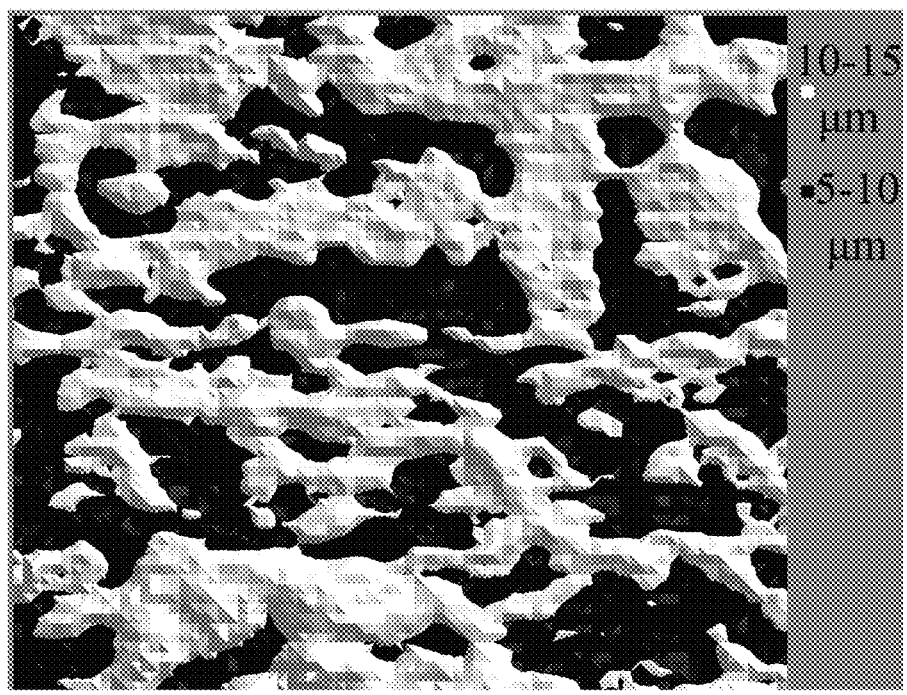
FIG. 5 is a changing spectrum of micro morphology of the to-be-measured area obtained through isostatic pressing white light interference scanning in the embodiment of the present invention.
Figure 6:
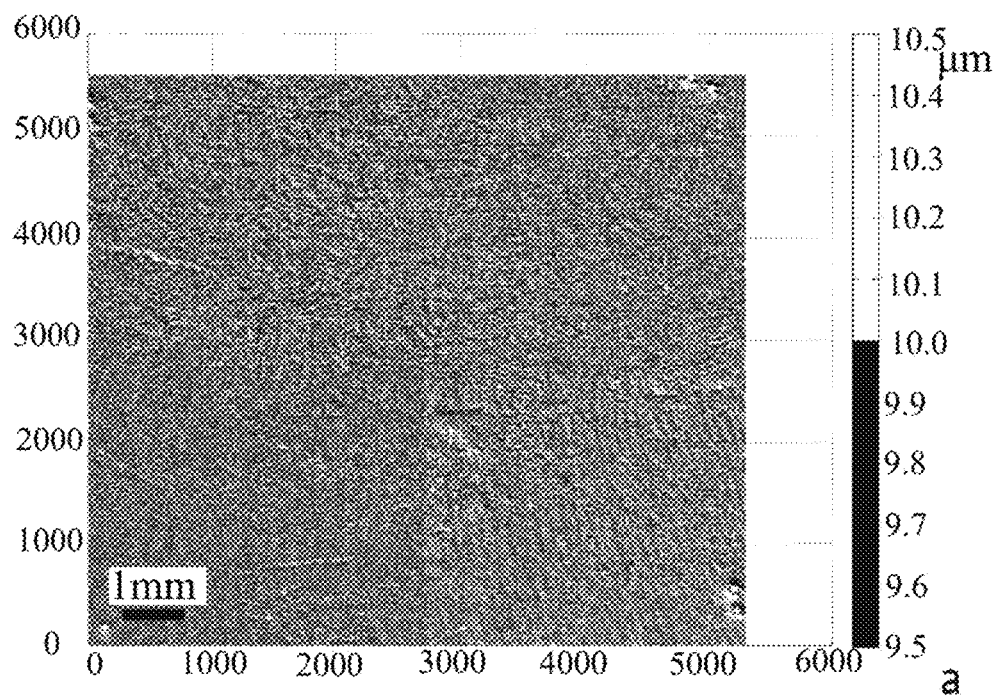
FIG. 6 is a trans-scale and rapid quantitative statistical distribution characterization map of isostatic pressing white light interference scanning of the microstructures in the to-be-measured area in the embodiment of the present invention.

Characterization of micromechanical property of carbide and ferrite a) the high-chromium cast iron samples with grade of KmTBCr15Mo are prepared based on the requirement of metallography analysis; the prepared samples are subjected to grinding and polishing procedures to enable the surface of the sample to be mirror finish with no grinding defects, and the polished sample surface is marked with one square area with the size of the marked area being 10 mm×10 mm.

b) a white light interferometry 3D surface profiler is utilized to perform initial morphology measurement on the surface of an alloy sample to obtain the size, spacing and length-width ratio of microstructures on the initial alloy surface;

as a verification and comparison, a metallography method is adopted to measure the relative distribution of carbide and ferrite in KmTBCr15Mo high-chromium cast iron sample and the percentage, size, spacing and length-to-width ration parameters of the microstructure on the surface of the alloy, and the feature area is selected to be 250 μm×250 μm and occupies for 0.625‰ of the marked area (10 mm×10 mm), as shown in FIG. 3 and FIG. 4.

c) an isostatic pressing technology is utilized to obtain the microstructure deformation on the surface of the alloy, and then a white light interferometry 3D surface profiler is utilized to perform deformation measurement statistics to obtain the microscopic distribution of the alloy microstructure; and the deformation strength of all the structures of the corresponding area is obtained through mapping the digital signals of the surface deformation obtained through comparative statistical analysis. The greater the deformation is, the greater the difference of the mechanical properties of the metallography is. Based on the relative distribution of different deformation areas after isostatic pressing treatment, the changing spectrum of micro morphology of size, spacing and length-width ratio corresponding to the carbide and ferritic phase is obtained, as shown in FIG. 5.

d) trans-scale and rapid quantitative statistical distribution characterization is performed on the microscopic deformation data of the microstructure on the surface of an alloy: statistical and comprehensive evaluation is performed on the metallography of the alloy microstructure, wherein the changing spectrum of micro morphology acquired in step c) is converted into a data matrix form. The mapping map of the data matrix is the corresponding metallography, the metallography data of corresponding areas can be respectively calculated based on the size of different crystal grains on the matrix, so as to perform trans-scale and rapid quantitative and statistical distribution characterization on the metallography of the microstructure of the to-be-measured area, as shown in FIG. 6.

The present invention can be used for trans-scale and rapid quantitative statistical distribution characterization of full-field metallography of fluid micro-explored strain for alloy microstructure.

The invention claimed is:

1. A full-field statistical & characterizing method of fluid micro-explored strain for alloy microstructure, comprising the following steps:
   a. grinding and polishing the surface of an alloy sample to mirror with no grinding defects, and then determining a to-be-measured area on the surface of the alloy sample;
   b. utilizing a white light interferometry 3D surface profiler to perform initial morphology measurement on the surface of the alloy sample to obtain the size, spacing and length-width ratio of microstructures on initial alloy surface;
   c. utilizing isostatic pressing technology to obtain the microstructure deformation on the surface of the alloy sample, and then utilizing a white light interferometry 3D surface profiler to perform deformed morphology measurement on the surface of the alloy sample to obtain the size, spacing and length-width ratio of the deformed microstructures on the surface of the alloy; performing statistical analysis on the comparison between the size, spacing and length-width ratio of the microstructures on the initial alloy surface and those of the microstructures on the deformed alloy surface to obtain deformation data on the surface of the alloy, and mapping to obtain the deformation strength of the microstructures on the surface of the alloy; and calculating to obtain a changing spectrum of micro morphology of the size, spacing and length-width ratio of the microstructures on the surface of the alloy base on distribution of deformation strength of the microstructures on the surface of the alloy;
   d. performing trans-scale and rapid quantitative statistical distribution characterization on the morphology change before and after isostatic pressing of the microstructures in the to-be-measured area of the alloy, so as to obtain a corresponding full-field metallographic spectrum.

2. The full-field statistical & characterizing method of fluid micro-explored strain for alloy microstructure of claim 1, wherein the alloy sample is prepared based on the requirement of metallography analysis.

3. The full-field statistical & characterizing method of fluid micro-explored strain for alloy microstructure of claim 1, wherein in step a, the size of the to-be-measured area is 1~25 mm×1~25 mm.

4. The full-field statistical & characterizing method of fluid micro-explored strain for alloy microstructure of claim 1, wherein in steps b and c, analysis method in measuring software of the white light interferometry 3D surface profiler is set to be a surface scanning mode, and scanned area is larger than the to-be-measured area.

5. The full-field statistical & characterizing method of fluid micro-explored strain for alloy microstructure of claim 1, wherein in steps b and c, the white light interferometry 3D surface profiler performs multiple scanning directly to obtain morphology change and the distributed digital signals of the surface of the alloy sample.

6. The full-field statistical & characterizing method of fluid micro-explored strain for alloy microstructure of claim 1, wherein in step c, the isostatic pressing technology is as follows: the alloy sample is placed in an isostatic pressing machine, a pressure of 50-200 MPa is applied in room temperature for 10-30 minutes, thereby enabling the microstructures on the surface of the alloy sample to form a vertical elastic plastic deformation.

7. The full-field statistical & characterizing method of fluid micro-explored strain for alloy microstructure of claim 6, wherein the pressure transmission medium in the isostatic pressing machine is liquid or gas which can effectively transmit pressure and has no corrosion and pollution to the to-be-measured sample.

8. The full-field statistical & characterizing method of fluid micro-explored strain for alloy microstructure of claim 1, wherein in step d, the changing spectrum of micro morphology obtained in step c is converted to a data matrix form; with the data matrix as a mapping map, the isostatic pressing deformation data corresponding to the to-be-measured area are respectively calculated, thereby realizing rapid and trans-scale quantitative statistics and characterization analysis of metallography of the microstructures in the to-be-measured area.

* * * * *